US010831801B2

(12) United States Patent
Sun et al.

(10) Patent No.: US 10,831,801 B2
(45) Date of Patent: *Nov. 10, 2020

(54) CONTEXTUAL-BASED HIGH PRECISION SEARCH FOR MAIL SYSTEMS

(71) Applicant: INTERNATIONAL BUSINESS MACHINES CORPORATION, Armonk, NY (US)

(72) Inventors: Pei Sun, Beijing (CN); Shu Qiang Li, Beijing (CN); Na Pei, Beijing (CN); Wei Guo Lu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 15/593,706

(22) Filed: May 12, 2017

(65) Prior Publication Data

US 2018/0329986 A1 Nov. 15, 2018

(51) Int. Cl.
*G06F 17/30* (2006.01)
*G06F 16/33* (2019.01)
(Continued)

(52) U.S. Cl.
CPC ........ *G06F 16/334* (2019.01); *G06F 16/3344* (2019.01); *G06F 40/263* (2020.01); *G06Q 10/107* (2013.01); *H04L 51/22* (2013.01)

(58) Field of Classification Search
CPC .. G06F 16/334; G06F 16/3344; G06F 17/275; G06Q 10/107; H04L 51/22
See application file for complete search history.

(56) References Cited

U.S. PATENT DOCUMENTS 7,369,987 B2 5/2008 Loofbourrow
7,937,402 B2 5/2011 Feng
(Continued)

FOREIGN PATENT DOCUMENTS

WO 2016162842 A1 10/2016

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Huawen A Peng
(74) *Attorney, Agent, or Firm* — Michael O'Keefe

(57) ABSTRACT

A method, computer system, and computer program product for contextually searching an electronic mail system is provided. The embodiment may include generating a contextual language set based on a language tag assigned to each electronic mail message within an electronic mailbox, whereby the generated contextual language set includes a first language and a second language. The embodiment may also include receiving a search term. The embodiment may further include identifying the received search term is drafted in the first language. The embodiment may also include generating a root character string of the identified search term. The embodiment may further include executing a search query of electronic mail messages within the electronic mailbox drafted in the first language using the generated root character string. The embodiment may also include executing a search query of electronic mail messages within the electronic mailbox drafted in the second language using the identified search term.

20 Claims, 8 Drawing Sheets

(51) Int. Cl.
*H04L 12/58* (2006.01)
*G06Q 10/10* (2012.01)
*G06F 40/263* (2020.01)

(56) References Cited

U.S. PATENT DOCUMENTS

| | | | |
|---|---|---|---|
| 8,548,797 | B2 | 10/2013 | Kim et al. |
| 8,606,826 | B2 | 12/2013 | Datta |
| 8,849,854 | B2 | 9/2014 | Kakarla |
| 9,699,129 | B1* | 7/2017 | Nelken .................. H04L 51/26 |
| 2007/0106500 | A1 | 5/2007 | Loofbourrow et al. |
| 2010/0318555 | A1* | 12/2010 | Broder ................. G06Q 10/107 |
| | | | 707/769 |
| 2012/0109970 | A1 | 5/2012 | Hornkvist et al. |
| 2012/0330989 | A1 | 12/2012 | Tan et al. |
| 2013/0151503 | A1 | 6/2013 | Pfeifle |
| 2014/0188454 | A1 | 7/2014 | Mittal et al. |
| 2016/0299954 | A1 | 10/2016 | Bawri et al. |
| 2018/0329986 | A1 | 11/2018 | Sun |

OTHER PUBLICATIONS

Google, "language-detection", Google Code Archive—Long-term storage for Google Code Project Hosting, https://code.google.com/archive/p/language-detection/, printed Apr. 21, 2017, pp. 1-4.

Solr, "Learn more about Solr", Apache Solr, http://lucene.apache.org/solr/, printed Apr. 21, 2017, pp. 1-6.

Elastic, "Open Source Search & Analytics", Elasticsearch | Elastic, https://www.elastic.co/, printed Apr. 21, 2017, pp. 1-2.

Elastic, "Pitfalls of Mixing Languages", Elasticsearch: The Definitive Guide [2.x] | Elastic, https://www.elastic.co/guide/en/elasticsearch/guide/current/language-pitfalls.html, printed May 12, 2017, pp. 1-4.

IBM: List of IBM Patents or Patent Applications Treated as Related (Appendix P), Mar. 9, 2018, pp. 1-2.

Sun et al., "Contextual-Based High Precision Search for Mail Systems", Pending U.S. Appl. No. 15/844,026, filed Dec. 15, 2017, pp. 1-26.

* cited by examiner

CONTEXTUAL-BASED HIGH PRECISION SEARCH FOR MAIL SYSTEMS

BACKGROUND

The present invention relates, generally, to the field of computing, and more particularly to electronic mail system querying.

A query may relate to a question statement in order to obtain specific information related to the topic of the query. Typically, a query may be posed to obtain data that is retained within a database. For example, a user may enter a query statement to locate a specific document stored within the database. Various methods of querying may also exist, such as choosing query parameters from a menu, querying by example, and user-entered query language (e.g. a natural language statement).

SUMMARY

According to one embodiment, a method, computer system, and computer program product for contextually searching an electronic mail system is provided. The embodiment may include generating a contextual language set based on a language tag assigned to each electronic mail message within an electronic mailbox, whereby the generated contextual language set includes a first language and a second language. The embodiment may also include receiving a search term. The embodiment may further include identifying the received search term is drafted in the first language. The embodiment may also include generating a root character string of the identified search term. The embodiment may further include executing a search query of a plurality of electronic mail messages within the electronic mailbox drafted in the first language using the generated root character string. The embodiment may also include executing a search query of a plurality of electronic mail messages within the electronic mailbox drafted in the second language using the identified search term.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
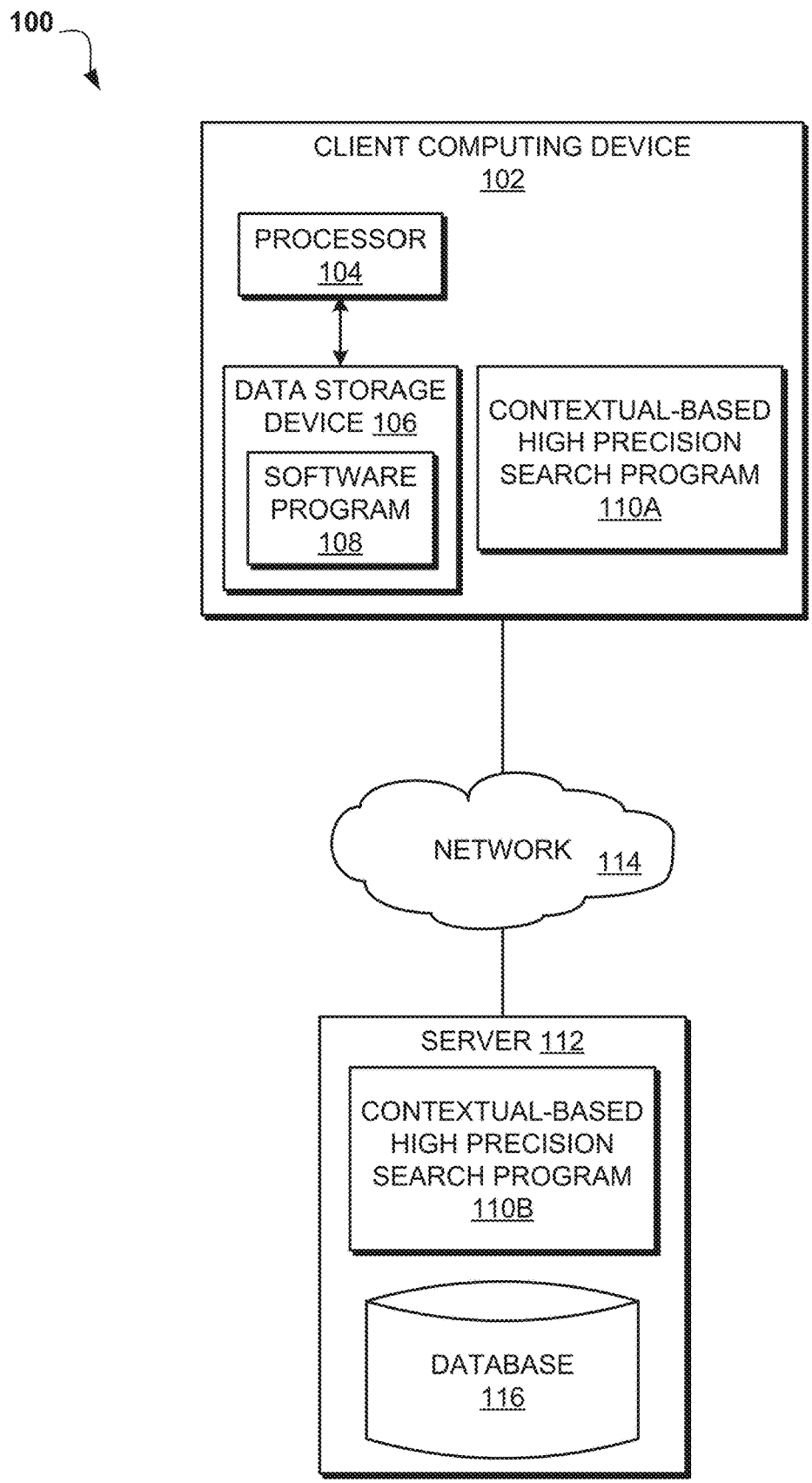
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to electronic mail system querying. The following described exemplary embodiments provide a system, method, and program product to, among other things, automatically searching a user electronic mailbox with user-entered search keywords in various language processors. Therefore, the present embodiment has the capacity to improve the technical field of mail system querying by improving the search quality of mail system queries by efficiently returning query results presented in various languages.

As previously described, a query may relate to a question statement in order to obtain specific information related to the topic of the query. Typically, a query may be posed to obtain data that is retained within a database. For example, a user may enter a query statement to locate a specific document stored within the database. Various methods of querying may also exist, such as choosing query parameters from a menu, querying by example, and user-entered query language (e.g. a natural language statement).

When utilizing an electronic mail system, a search function may be a key feature for users, especially enterprise email users. A search function is a feature of an electronic mail system that allows a user to enter one or more keywords in order to locate sent or received messages that relate to or contain the one or more keywords. For users that receive large numbers of email messages during a specified period of time, the search function may be a vital tool to maintaining job efficiency as the location of past messages may be necessary to a user's job functioning.

The search function of an electronic mail system may support two major phases: 1) an index phase, and 2) a query phase. The index phase may be a process where documents are made searchable. During the index phase, a processor generates a set of terms for a document, and stores the terms in a global inverted index table. The query phase may be the process within which input query keywords are made understandable by the search engine. During the query phase, the processor generates a term set from the input, and then locates the terms inside the inverted index table to identify the document containing the terms.

A term may relate to a key element stored within the inverted index table to link words with documents. A term may be any character (e.g., word, integer, etc.) or series of characters depending on the processor implemented. Furthermore, a search feature may utilize stemming technology (e.g., word truncation) to identify more accurate results for a given search team by identifying the root of a word rather than searching for the form of the word as input by a user. For example, the words "purchase" and "purchasing" each contain the root character sequence of "purchas." Therefore, if a document or query contains either the word "purchase"

or "purchasing," only the root sequence "purchas" may be recorded to or searched within the inverted index table.

Furthermore, language is an important element of search features. Many search systems utilize natural language processing technology and language processors to understand both mail message content and keywords during the indexing and querying phases. For example, messages and keywords entered in English require the mail system to utilize an English language processor to preprocess the messages and keywords in order to achieve better search results. Similarly, messages and keywords entered in Chinese require a corresponding Chinese language processor for accurate search results.

However, despite having a proper language processor, a search function may return flawed results if a user receives emails in more than one language since the scope of the processor may only encompass a single language. For example, an English language processor may only be capable of searching messages and keywords in English and not messages and keywords in Chinese. Additionally, different language processors may generate different term sequences for the same input sentence. For example, an English language processor may generate the term sequence "sing|dog" from the sentence "singing dogs." However, a Chinese language processor may generate the term sequence "singing|dogs" from the same sentence since the Chinese language processor may not be capable of properly processing English language sentences.

Many mail systems require messages and keywords to be processed in a processor of the same language in which the messages and keywords are presented to ensure the stored term generated for each word during the index phase can be located by the same term generated during the query phase. Mismatching index and query processors may lead to bad search results. For example, if the English language phrase "singing dogs" is indexed with an English language processor but a query is executed for the English word "singing" using a Chinese language processor, a different "singing" term may be generated which may not be properly matched with the indexed keywords from the phrase "singing dogs." This situation may be frequently experienced by individuals that interact in a multi-cultural world. For example, a sales associate may draft and receive many emails in English when communicating within an internal office. However, the same associate may be responsible for many Chinese clients with whom emails are exchanged in Chinese. For such a user, an accurate mail system search may be difficult if only one language is used for indexing and processing mail system search queries. As such, it may be advantageous to, among other things, identifying the language utilized in each recorded mail message during the indexing process and searching all messages within search parameters using a language processor appropriate for the contextual search terms.

According to one embodiment, detecting the language used in specific keywords, may be difficult since a language may require proper context to determine the intended usage of a word. For example, given a common keyword without adequate context, a system may have difficulty determining whether a word is presented in Japanese or Traditional Chinese. Therefore, when indexed, each message may be tagged with the language in which the message is drafted. Once the parameters of a mail search are established, each language represented by the messages that satisfy the user-established parameters may be utilized to generate contextually accurate keywords. The keywords may then be used to search each message within the search parameters thereby improving the precision of the search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to record the language in which each message is drafted during the indexing phase of mail system search process. Once a user-entered keyword is received, messages in the same language as the keyword may be searched with an appropriate language processor using a truncated form of the keyword. Messages not drafted in the same language as the user-entered keyword may be searched with a corresponding language processor using a non-truncated form of the keyword to ensure search results are not tainted with false hits due to similar words across languages.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a contextual-based high precision search program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a contextual-based high precision search program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the contextual-based high precision search program 110A, 110B may be a program capable of recording and tagging received electronic mail messages in a mail system based on the language in which the text of a received message is presented. Furthermore, the contextual-based high precision search program 110A, 110B may query a group of received mail messages based on keywords where the keywords may be contextually transformed into a truncated root form and a non-truncated form based on the tags of the mail messages being searched. Therefore, the contextual-based high precision search program 110A, 110B may allow for electronic mail messages in more than one language to be searched with high precision results. The contextual-based high precision search method is explained in further detail below with respect to FIG. 2.

Figure 2:
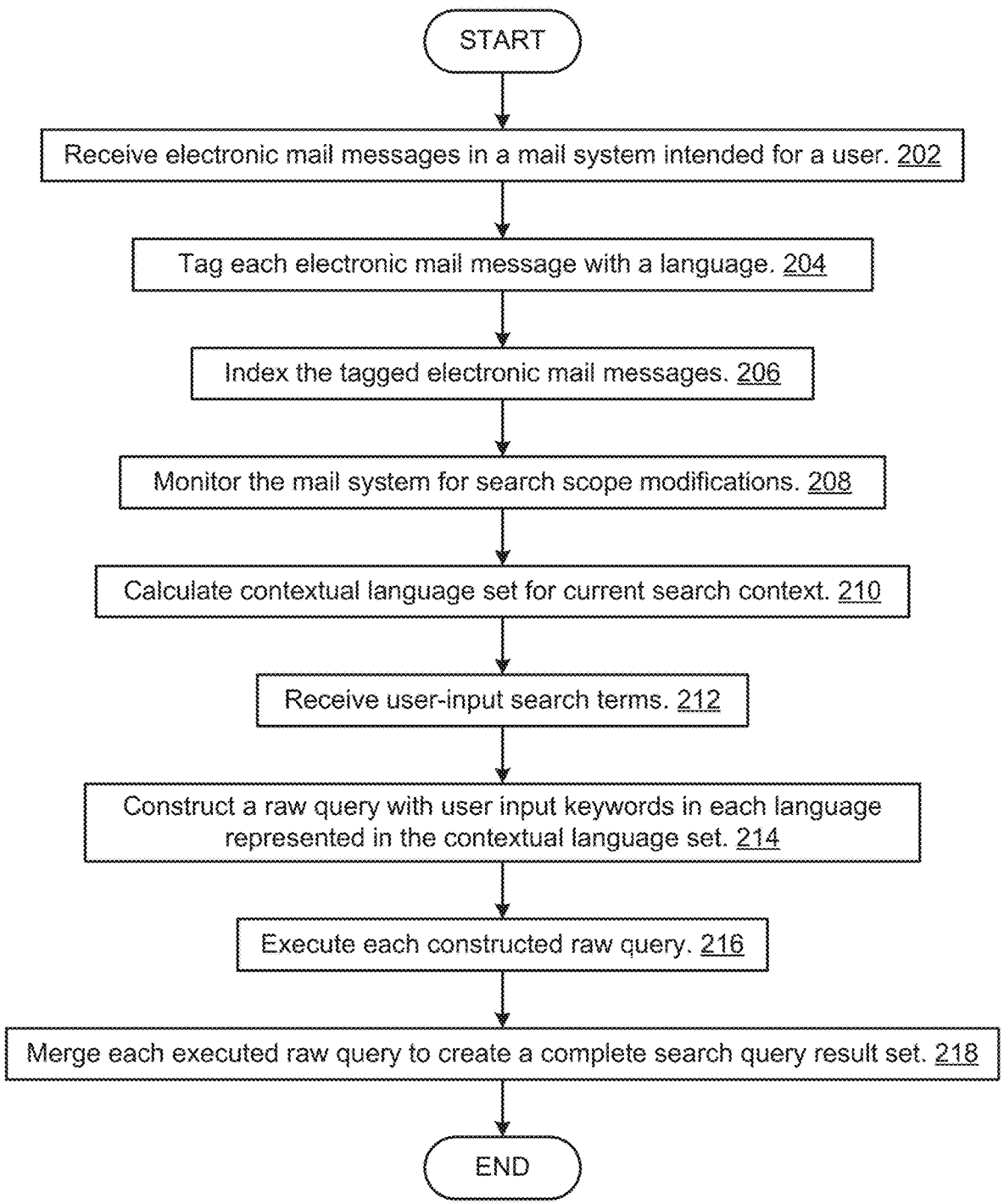
FIG. 2 is an operational flowchart illustrating a contextual-based high precision search process according to at least one embodiment.

Referring now to FIG. 2, an operational flowchart illustrating a contextual-based high precision search process 200 is depicted according to at least one embodiment. At 202, the contextual-based high precision search program 110A, 110B receives electronic messages in a mail system intended for a user. During typical operating procedures, a mail system may receive electronic mail messages from a sender to a recipient where the recipient is associated with a user profile that may be stored in the mail system. The electronic mail messages received by the mail system may include email messages, text messages, short message service messages, or voice messages. Furthermore, the received messages may include attachments, such as images, videos, or document files.

Then, at 204, the contextual-based high precision search program 110A, 110B tags each received electronic mail message with a language. Upon receiving an electronic message, the contextual-based high precision search program 110A, 110B may utilize a language detector and known natural language processing techniques to identify the language used to compose the message. For example, the contextual-based high precision search program 110A, 110B, using a language detector, may identify English as the language used to draft a received message. In at least one embodiment, if multiple languages are used to compose a message, the language detector may identify all languages used to draft the message. For example, the contextual-based high precision search program 110A, 110B may identify the first paragraph of an email may be composed using Japanese but the second paragraph of the email may be composed using Chinese to convey messages to different recipients with different language proficiencies. Once the language used to draft the received message is identified, the contextual-based high precision search program 110A, 110B may tag the received message with the identified language by adding a language field to the metadata of the mail entry. For example, if the contextual-based high precision search program 110A, 110B identifies English as the language used to draft the received message, a language field may be entered in the mail entry and populated with the word "English." Based on the identified language used to compose the received message, a corresponding language processor may be used to generate a language optimized term stream for the message. The language optimized term stream, once generated, may be stored within a data repository, such as database 116.

Next, at 206, the contextual-based high precision search program 110A, 110B indexes the tagged electronic mail messages. As previously described, a search system may support an index phase where documents are made searchable. During the index phase, a processor may generate a set of terms for a document, and stores the terms in a global inverted index table. Once the received message is tagged with the identified language, the contextual-based high precision search program 110A, 110B may index the received message using known indexing techniques so the received message may be searchable during the query phase when search terms are received by the contextual-based high precision search program 110A, 110B from a user. For example, the contextual-based high precision search program 110A, 110B may index a received message by isolating each word or phrase within the message and logging the corresponding location or each isolated word or phrase in the global inverted index table. The location of the indexed isolated words and phrases may be subsequently identified during a user search by the contextual-based high precision search program 110A, 110B querying the global inverted index table. Furthermore, the global inverted index table may be stored within a data repository, such as database 116.

Then, at 208, the contextual-based high precision search program 110A, 110B monitors the mail system modifications to the search scope. Various parameters may be established by a user when executing a search of a user mailbox. For example, a user may choose to only search within a particular folder (e.g., an inbox folder, a deleted messages folder, a sent messages folder, or a user-created folder), a date range, or an addressee (e.g., an individual listed in the To: field, the carbon copy field, or the blind carbon copy field).

Then, at 210, the contextual-based high precision search program 110A, 110B calculates a contextual language set for a current search context. The contextual-based high precision search program 110A, 110B may calculate the contextual language set based on the current search scope established by the user, or pre-established by the mail system. The contextual language set may encompass all languages tagged within the group of messages within the current search scope. For example, if the current search scope of the user mailbox for a user includes emails in the English language and the Spanish language, the contextual language set may include the English language and the Spanish language since both languages are used in messages captured by the current search scope. Furthermore, the contextual-based high precision search program 110A, 110B may record the language set as an abbreviation of each language included in the contextual search scope. For example, if the contextual language set includes the English language and the Spanish language, the contextual-based high precision search program 110A, 110B may record the contextual language set as [en, es]. Additionally, the contextual-based high precision search program 110A, 110B may generate a default contextual language set that corresponds to the largest contextual language set of the user mailbox.

Next, at 212, the contextual-based high precision search program 110A, 110B receives user-input search terms. When a user is prepared to execute a search query of the indexed terms within the global inverted index table, the user may input search terms to be received by the contextual-based high precision search program 110A, 110B. The search terms may be any alphanumeric combination of characters, such as integers, keywords, or natural language syntax. The search terms may be entered using a computer peripheral device, such as a keyboard, a microphone with voice-to-text capabilities, or a touchscreen monitor.

Then, at 214, the contextual-based high precision search program 110A, 110B constructs a raw query using user input keywords for each language represented in the contextual language set. Upon receiving the user-input search terms, the contextual-based high precision search program 110A, 110B may construct a raw query. If the user-input search terms are in the form of natural language, the contextual-based high precision search program 110A, 110B may identify keywords from the natural language text by isolating important words or phrases. Additionally, as previously described, the contextual-based high precision search program 110A, 110B may determine a root word or character string to use during the query phase when searching the global inverted index table in the language with which the keywords were drafted. For example, if the user-entered keyword is the English word "purchase", the contextual-based high precision search program 110A, 110B may identify the character string "purchas" as the keyword with which to search the global inverted index table for the English language. By shortening user-entered keywords to a root word or character string, the contextual-based high precision search program 110A, 110B may obtain more relevant search results. For example, by shortening the user-entered keyword "purchase" to the character string "purchas", the contextual-based high precision search program 110A, 110B may identify the location of other forms of the user-entered keyword "purchase", such as "purchasing" or "purchased."

Furthermore, when searching messages tagged with a language that is not the same as that of the user-entered keywords, the contextual-based high precision search program 110A, 110B may search the messages drafted in the other language using the keywords as entered by the user and not the truncated, root form of the keyword. For example, if a user writes emails in English and Spanish and enters the keyword "larga" into a search field, the contextual-based high precision search program 110A, 110B may identify the keyword "larga" as being written in Spanish and truncate the keyword to the root form "larg." The contextual-based high precision search program 110A, 110B may then search all messages tagged as being drafted in Spanish and satisfying the search parameters with the root form "larg" using the Spanish language processor. However, the contextual-based high precision search program 110A, 110B may not search messages tagged as being drafted in English and satisfying the search parameters with the root form "larg" since doing so would return results with the English word "large." Since the Spanish word "larga" translates to the English word "long," obtaining results in English that pertain to the English word "large" may taint the search results obtained by the contextual-based high precision search program 110A, 110B. Therefore, the contextual-based high precision search program 110A, 110B may search all messages tagged as being drafted in English and satisfying the search parameters with the keyword "larga" as the keyword was entered by the user using the English language process. By conducting such a search of the messages drafted in English, the contextual-based high precision search program 110A, 110B may ensure that no false results may be captured and the complete search results may be more accurate.

Next, at 216, the contextual-based high precision search program 110A, 110B executes each constructed raw query. Once the keyword has been transformed according to the language in which each message was drafted based on step 214, the contextual-based high precision search program 110A, 110B may execute search queries of the user mailbox based on the input parameters established by the current search scope. For example, if the user sets the search scope to encompass the "Sent Mail" folder for all message addressed to "Bob", the contextual-based high precision search program 110A, 110B will execute a search of the "Sent Mail" folder for all messages addressed to "Bob" using the appropriately truncated keyword. Therefore, if the user-entered keyword is "larga" and the contextual language set includes the English, Chinese, and Spanish languages, the contextual-based high precision search program 110A, 110B will execute three individual searches of the "Sent Mail" folder for all messages addressed to "Bob." An individual search of the English and Chinese drafted messages in the for the keyword "larga" using the English language processor and the Chinese language processor, respectively, and a search query of the Spanish drafted message for the root word "larg" using the Spanish language processor may each be executed. Since the word "larga" may not exist in the English or Chinese languages, the contextual-based high precision search program 110A, 110B may not return any results for the keyword "larga."

Then, at 218, the contextual-based high precision search program 110A, 110B merges each executed raw query to create a complete search query result set. The contextual-based high precision search program 110A, 110B may merge all of the returned search results for each language within the contextual language set together to generate a complete set of search results for the user-entered search terms. For example, if individual queries were executed for the English, Chinese, and Spanish languages, as previously described, the contextual-based high precision search program 110A, 110B may merge each set of returned search results to generate a complete set of search results for the user-entered search terms. In at least one embodiment, the contextual-based high precision search program 110A, 110B may transmit to and display the search results on a display screen associated with the client computing device 102.

It may be appreciated that FIG. 2 provides only an illustration of one implementation and does not imply any limitations with regard to how different embodiments may be implemented. Many modifications to the depicted environments may be made based on design and implementation requirements. For example, a user may speak and write in Chinese but converse with a business partner via email in Japanese. The user categorizes messages with the business partner in Folder A and messages related to travel in Folder B. Typically, if the user wishes to execute a search of Folder A to locate information related to a conversation with the business partner, a search processor may only search using traditional Chinese since that is the user is a Chinese speaking user. However, Folder A contains messages written in both Chinese and Japanese since Japanese is the primary language spoken by the business partner. Therefore, a query of Folder A may not yield accurate results under typical operating procedures since only a Chinese language processor may be implemented. However, if the contextual-based high precision search program 110A, 110B were utilized, an individual search of Folder A may be executed using both a Chinese language processor and a Japanese language processor. After the completion of each search, the contextual-based high precision search program 110A, 110B may merge the two search results and present the complete set of search results to the user.

In a similar example, a user mailbox contains emails in both Spanish and English. If the user wishes to locate an email containing information about a movie named, Larga Travesa, but the user is only able to recall the word "Larga" being in the movie title, the user may only submit a search query with the keyword "Larga". Typically, the search keyword may be processed by the Spanish language processor and converted to the root word "larg". Unfortunately, the English word "large" may also be converted to the same root word with the Spanish processor. Therefore, unrelated messages that contain the word "large" may also be returned. However, the contextual-based high precision search program 110A, 110B may only search message written in Spanish with the root word "larg" since messages written in Spanish may have a language tag identifying the language in which the message is written. Similarly, the contextual-based high precision search program 110A, 110B may not search the English language messages with an abbreviated root word. Therefore, the English language messages may be searched using the keyword "larga" and not messages will likely be returned since "larga" is not an English word.

Figure 3:
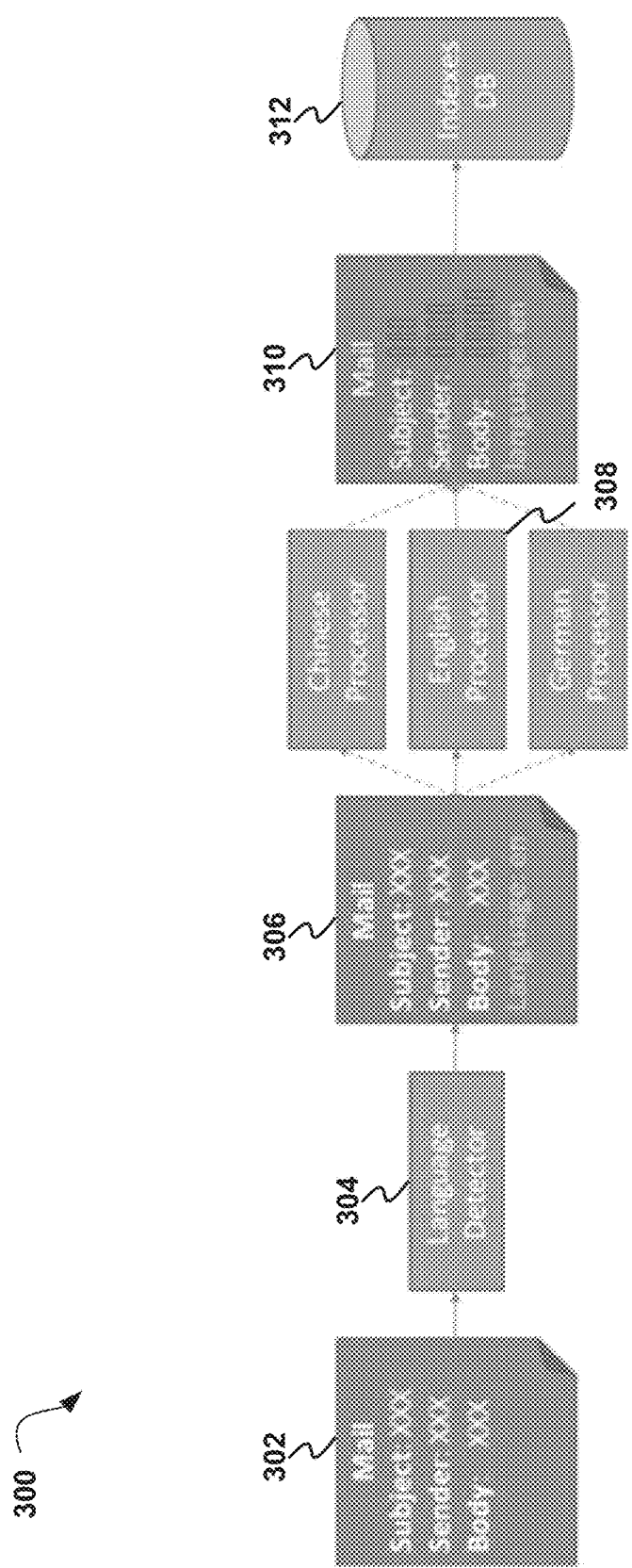
FIG. 3 is a mail message indexing block diagram according to at least one embodiment.

Referring now to FIG. 3, a mail message indexing block diagram 300 is depicted according to at least one embodiment. When a mail message 302 is received, the contextual-based high precision search program 110A, 110B may utilize a language detector 304 to analyze the natural language text within the received mail message 302 for the language used to draft the mail message 302. The contextual-based high precision search program 110A, 110B may then tag the language to the received mail message 306. The appropriate language processor, such as English language processor 308, may be utilized to generate index terms within the mail message 310. The indexed terms may then be stored within a data repository, such as indexes database 312.

Figure 4:
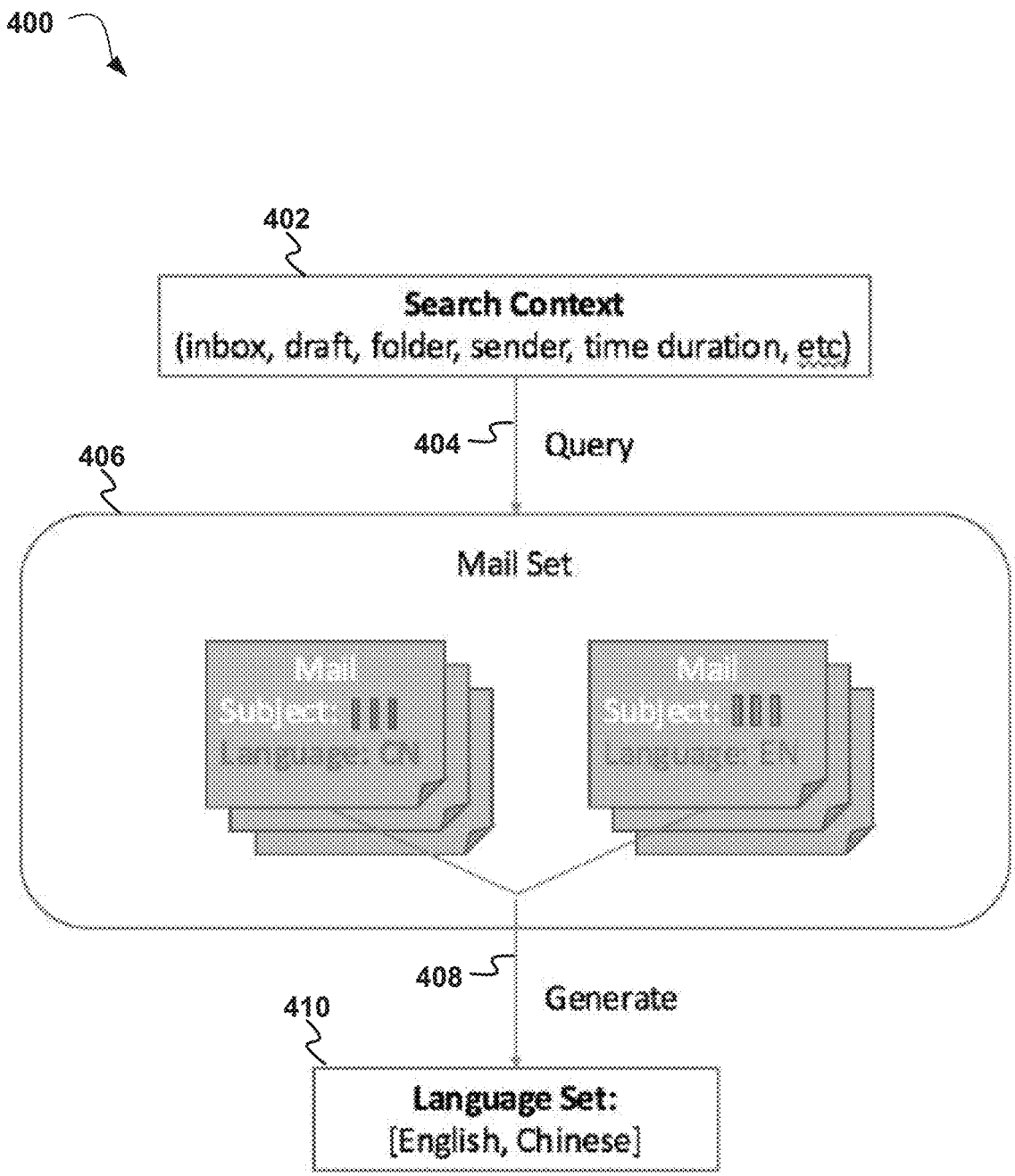
FIG. 4 is a contextual language set creation block diagram according to at least one embodiment.

Referring now to FIG. 4, a contextual language set creation block diagram 400 is depicted according to at least one embodiment. As previously described, a contextual language set is a group of languages utilized to draft mail messages encompassed by search criteria. For example, a user may establish a search context 402 that includes specific criteria for a search of the user mailbox, such as inbox folder, draft folder, user-created folder, sender, addressee, time period, etc. Once the search context 402 is established, the contextual-based high precision search program 110A, 110B may execute a query 404 of the mail set 406 that satisfies the parameters of the search context 402. For example, if the search context 402 is set for all messages received within the past 24 hours, the contextual-based high precision search program 110A, 110B may execute a query 404 that gathers all messages in the last 24 hours to create the mail set 406. The contextual-based high precision search program 110A, 110B may then generate 408 the language set 410 as each language that is represented by at least one mail message within the mail set 406.

Figure 5:
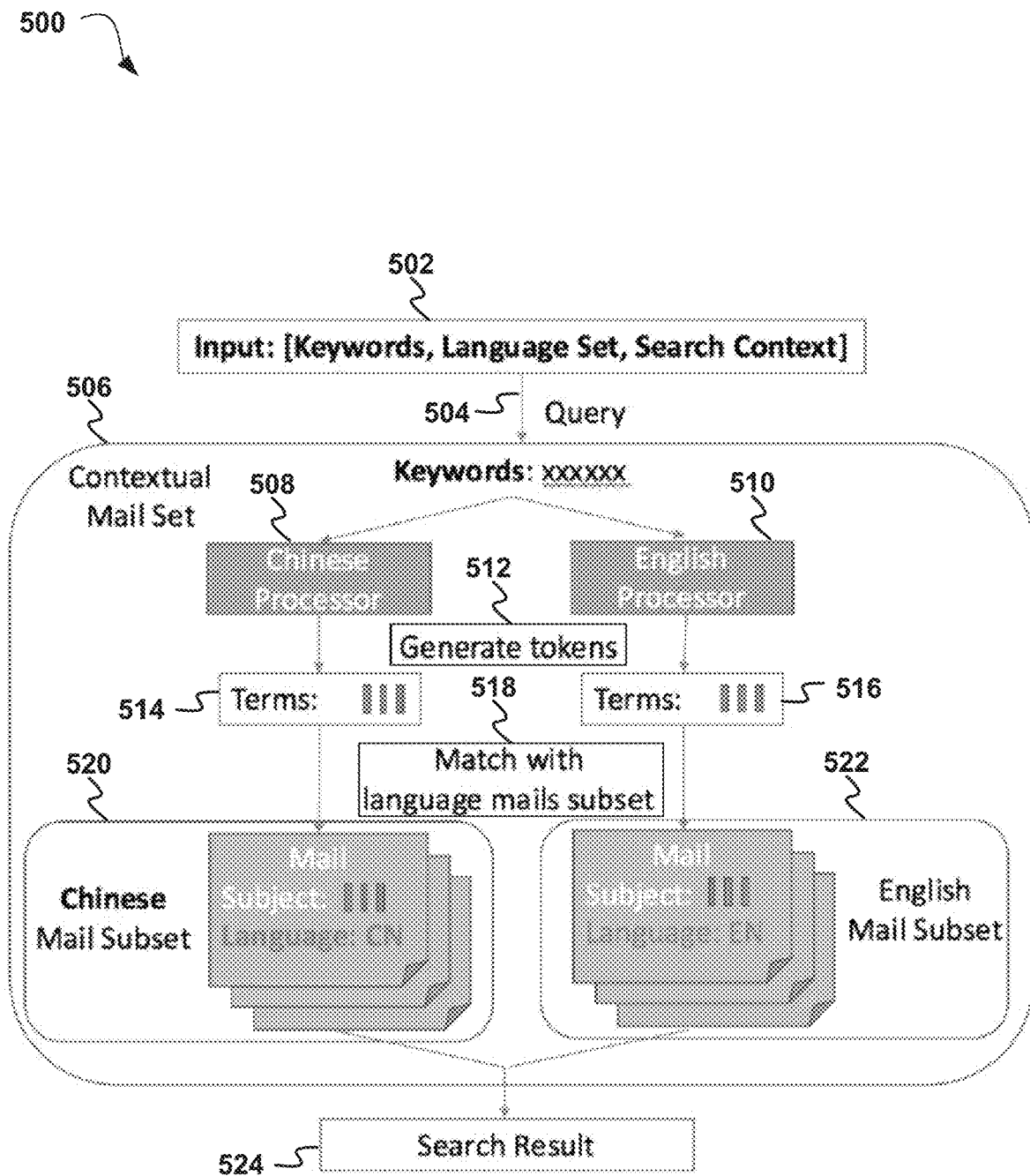
FIG. 5 is a raw query construction block diagram according to at least one embodiment.

Referring now to FIG. 5, a raw query construction block diagram 500 is depicted according to at least one embodiment. The contextual-based high precision search program 110A, 110B may utilize input parameters 502, such as keywords, the contextual language set, and search context, to query 504 the contextual mail set 506. If the contextual language set, includes a Chinese processor 508 and an English processor 510, the contextual-based high precision search program 110A, 110B may process the keywords independently through both the Chinese processor 508 and the English processor 510 to contextually transform the keywords, or a generate root word, for each of the keywords using generated tokens 512. Once each processor 508 and 510 has been utilized, corresponding sets of terms 514 and 516 may be matched with language mails subsets 518 that satisfy the input parameters 502. The contextual-based high precision search program 110A, 110B may now have a mail subset 520 satisfying the Chinese terms 514 and a mail subset 522 satisfying the English terms 516. The contextual-based high precision search program 110A, 110B may then merge the Chinese mail subset 520 and the English mail subset 522 to create the search result 524 which may be viewed by a user.

Figure 6:
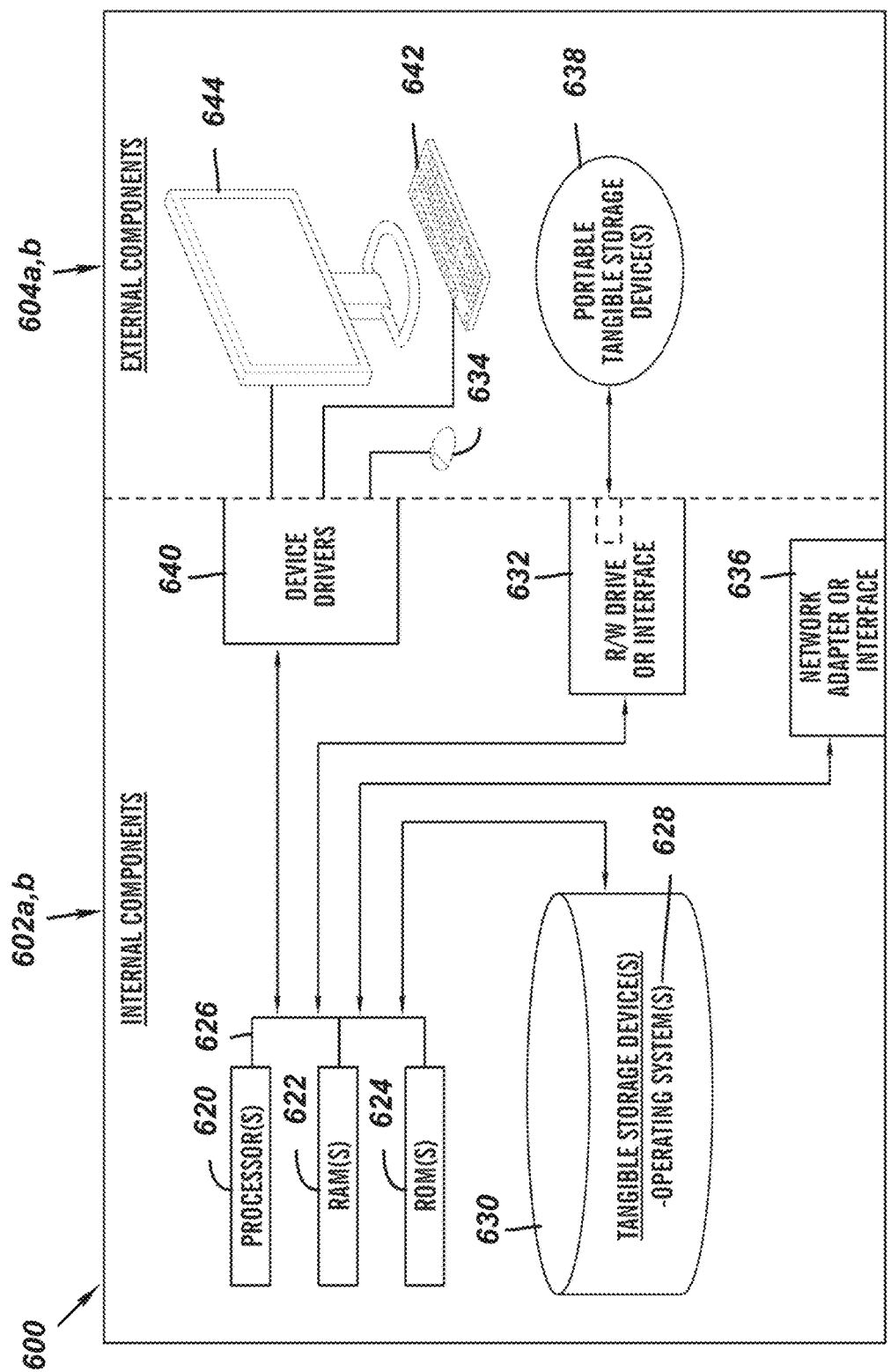
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 a,b and external components 604 a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the contextual-based high precision search program 110A in the client computing device 102 and the contextual-based high precision search program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the contextual-based high precision search program 110A, 110B, can be stored on one or more of the respective portable computer-readable tangible storage devices 638, read via the respective R/W drive or interface 632, and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. The software program 108 and the contextual-based high precision search program 110A in the client computing device 102 and the contextual-based high precision search program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the contextual-based high precision search program 110A in the client computing device 102 and the contextual-based high precision search program 110B in the server 112 are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 a,b can also include touch screens, virtual keyboards, touch pads, pointing devices, and other human interface devices. Each of the sets of internal components 602 a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
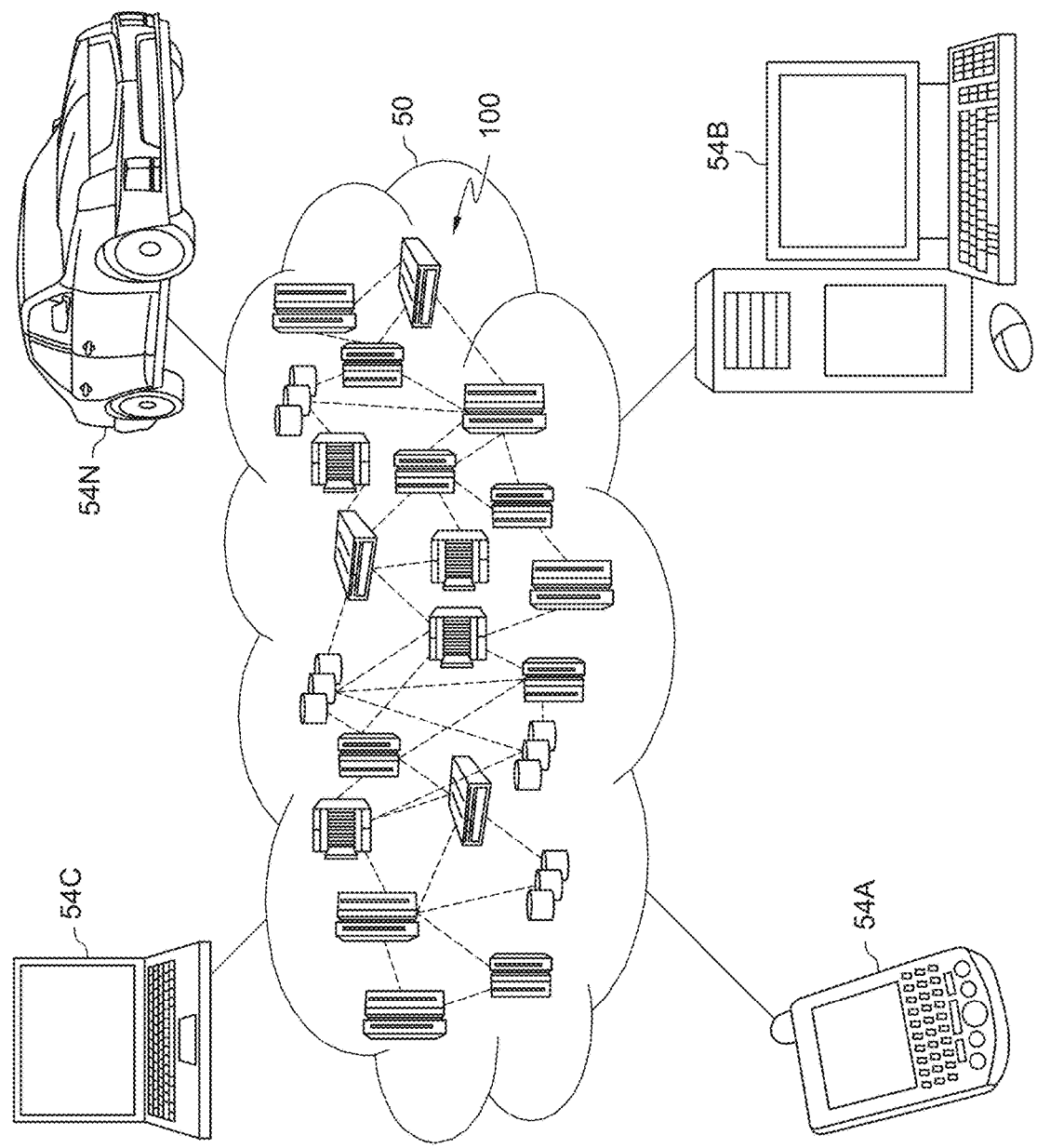
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
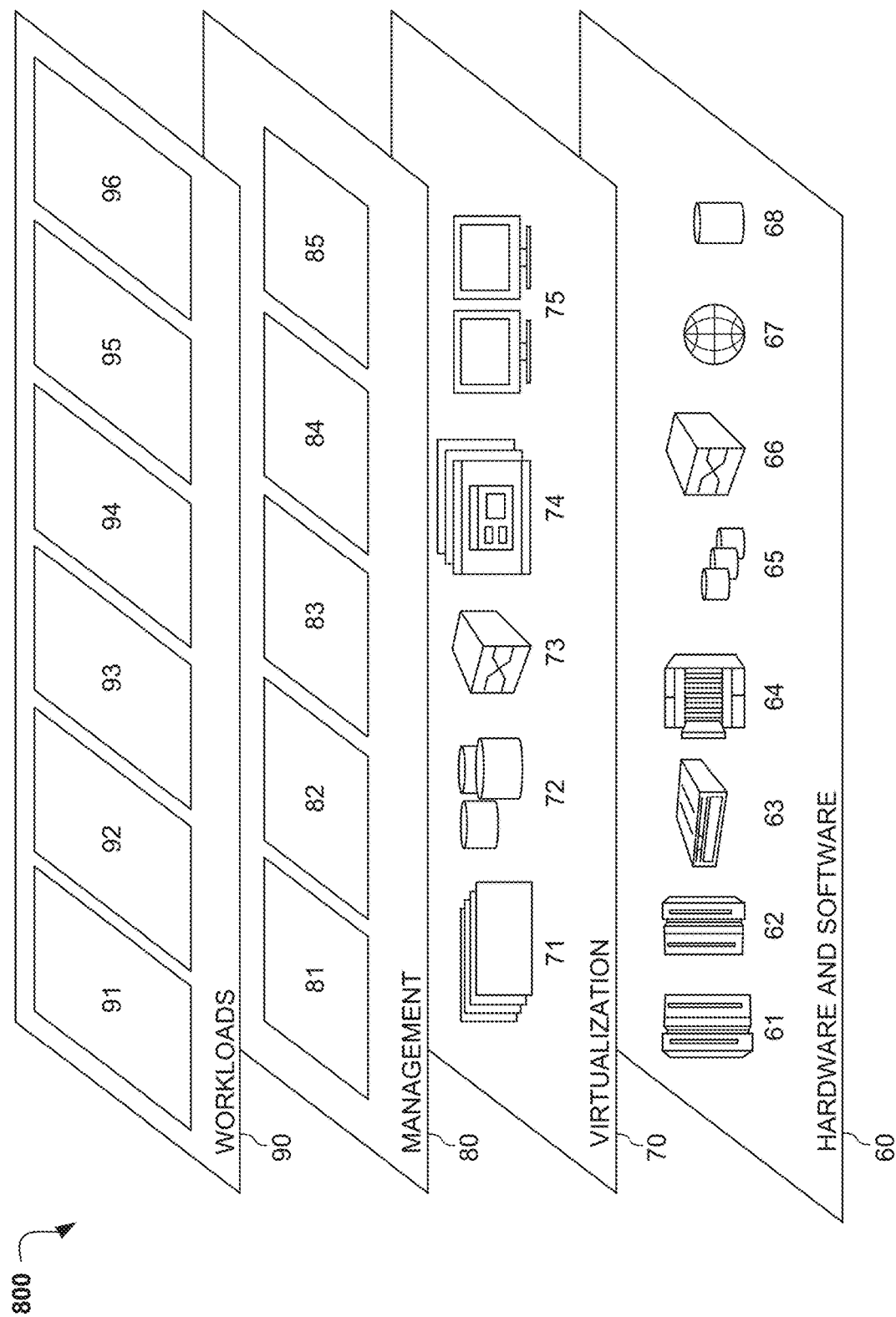
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual-based high precision searching 96. Contextual-based high precision searching 96 may relate to tagging received electronic mail messages based on the language in which each message is presented and executing a query where user-entered search terms are contextually translated into one or more languages based on the languages tagged to the messages within a group of messages to be searched.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for contextually searching an electronic mail system, the method comprising:

generating, by a processor, a contextual language set based on a language tag assigned to each electronic mail message within an electronic mailbox, wherein the generated contextual language set comprises a first language and a second language, and wherein a name of the contextual language set is recorded as an abbreviation of the first language and the second language;

indexing the received plurality of electronic mail messages in a global inverted index table, wherein each word or phrase within each electronic mail message and a corresponding location of each word or phrase is isolated and logged in the global inverted index table;

receiving a search term;

identifying the received search term is drafted in the first language;

generating a root character string of the identified search term;

executing a search query of a plurality of electronic mail messages within the electronic mailbox drafted in the first language using the generated root character string; and executing, simultaneously to the search query of the plurality of electronic mail messages in the first language, a search query of a plurality of electronic mail messages within the electronic mailbox drafted in the second language using the identified search term.

2. The method of claim 1, further comprising:

receiving a plurality of electronic mail messages in the electronic mail system addressed to a user; and assigning a language tag to each electronic mail message within the plurality of received electronic mail messages based on a language used to draft each electronic mail message.

3. The method of claim 2, wherein assigning the language tag to an electronic mail message within the plurality of electronic mail messages further comprises:

detecting the language using a language detector and a plurality of natural language processing techniques; and adding a language field to a plurality of metadata associated with the electronic mail message.

4. The method of claim 1, further comprising:

monitoring the electronic mailbox for at least one modification to a plurality of search parameters.

5. The method of claim 1, further comprising:

indexing the received plurality of electronic mail messages in a global inverted index table.

6. The method of claim 1, wherein further comprising:

receiving a plurality of search results for each executed search query; and generating a complete search query result set based on merging each received plurality of search results.

7. The method of claim 4, wherein the plurality of search parameters is selected from a group consisting of a mailbox folder, a date range, and a message addressee.

8. A computer system for contextually searching an electronic mail system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   generating a contextual language set based on a language tag assigned to each electronic mail message within an electronic mailbox, wherein the generated contextual language set comprises a first language and a second language, and wherein a name of the contextual language set is recorded as an abbreviation of the first language and the second language;
   indexing the received plurality of electronic mail messages in a global inverted index table, wherein each word or phrase within each electronic mail message and a corresponding location of each word or phrase is isolated and logged in the global inverted index table;
   receiving a search term;
   identifying the received search term is drafted in the first language;
   generating a root character string of the identified search term;
   executing a search query of a plurality of electronic mail messages within the electronic mailbox drafted in the first language using the generated root character string; and
   executing, simultaneously to the search query of the plurality of electronic mail messages in the first language, a search query of a plurality of electronic mail messages within the electronic mailbox drafted in the second language using the identified search term.

9. The computer system of claim 8, further comprising:
   receiving a plurality of electronic mail messages in the electronic mail system addressed to a user; and
   assigning a language tag to each electronic mail message within the plurality of received electronic mail messages based on a language used to draft each electronic mail message.

10. The computer system of claim 9, wherein assigning the language tag to an electronic mail message within the plurality of electronic mail messages further comprises:
   detecting the language using a language detector and a plurality of natural language processing techniques; and
   adding a language field to a plurality of metadata associated with the electronic mail message.

11. The computer system of claim 8, further comprising:
   monitoring the electronic mailbox for at least one modification to a plurality of search parameters.

12. The computer system of claim 8, further comprising:
   indexing the received plurality of electronic mail messages in a global inverted index table.

13. The computer system of claim 8, wherein further comprising:
   receiving a plurality of search results for each executed search query; and
   generating a complete search query result set based on merging each received plurality of search results.

14. The computer system of claim 11, wherein the plurality of search parameters is selected from a group consisting of a mailbox folder, a date range, and a message addressee.

15. A computer program product for contextually searching an electronic mail system, the computer program product comprising:
   one or more computer-readable tangible storage medium and program instructions stored on at least one of the one or more tangible storage medium, the program instructions executable by a processor, the program instructions comprising:
   program instructions to generate a contextual language set based on a language tag assigned to each electronic mail message within an electronic mailbox, wherein the generated contextual language set comprises a first language and a second language, and wherein a name of the contextual language set is recorded as an abbreviation of the first language and the second language;
   program instructions to index the received plurality of electronic mail messages in a global inverted index table, wherein each word or phrase within each electronic mail message and a corresponding location of each word or phrase is isolated and logged in the global inverted index table;
   program instructions to receive a search term;
   program instructions to identify the received search term is drafted in the first language;
   program instructions to generate a root character string of the identified search term;
   program instructions to execute a search query of a plurality of electronic mail messages within the electronic mailbox drafted in the first language using the generated root character string; and
   program instructions to execute, simultaneously to the search query of the plurality of electronic mail messages in the first language, a search query of a plurality of electronic mail messages within the electronic mailbox drafted in the second language using the identified search term.

16. The computer program product of claim 15, further comprising:
   program instructions to receive a plurality of electronic mail messages in the electronic mail system addressed to a user; and
   program instructions to assign a language tag to each electronic mail message within the plurality of received electronic mail messages based on a language used to draft each electronic mail message.

17. The computer program product of claim 16, wherein assigning the language tag to an electronic mail message within the plurality of electronic mail messages further comprises:
   program instructions to detect the language using a language detector and a plurality of natural language processing techniques; and
   program instructions to add a language field to a plurality of metadata associated with the electronic mail message.

18. The computer program product of claim 15, further comprising:
   program instructions to monitor the electronic mailbox for at least one modification to a plurality of search parameters.

19. The computer program product of claim 15, further comprising:

program instructions to index the received plurality of electronic mail messages in a global inverted index table.

20. The computer program product of claim 15, wherein further comprising:
program instructions to receive a plurality of search results for each executed search query; and
program instructions to generate a complete search query result set based on merging each received plurality of search results.

* * * * *